G. H. LANGTON.
SELF CUSHIONING WHEEL.
APPLICATION FILED OCT. 22, 1908.
945,468.
Patented Jan. 4, 1910.
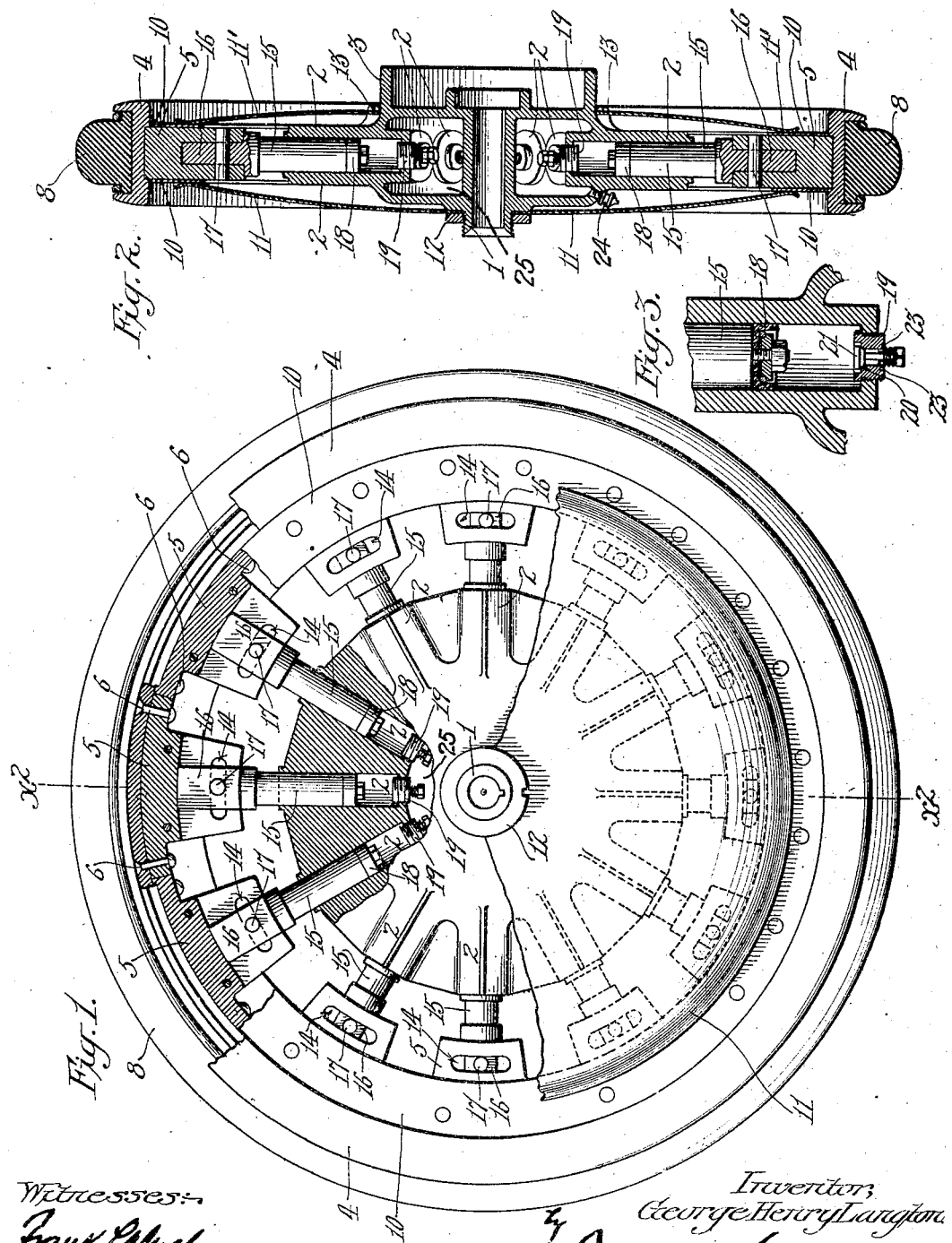
Inventor,
George Henry Langton

UNITED STATES PATENT OFFICE.

GEORGE HENRY LANGTON, OF LOS ANGELES, CALIFORNIA.

SELF-CUSHIONING WHEEL.

945,468.  Specification of Letters Patent.  Patented Jan. 4, 1910.

Application filed October 22, 1908. Serial No. 459,084.

*To all whom it may concern:*

Be it known that I, GEORGE HENRY LANGTON, a citizen of the United States, residing at Los Angeles, in the county of Los Angeles and State of California, have invented a new and useful Self-Cushioning Wheel, of which the following is a specification.

In a previous application of mine for improvement in wheels, filed August 10, 1908, Serial No. 447,880, I have shown and described a wheel in which compressed air is utilized to secure a cushioning effect between the rim and tire, the hub being utilized for an air chamber, the spokes being slidable in cylinders in the hub and so connected to the tire that they are adapted to oscillate with the tire in all directions except laterally. The compressed air which was utilized as a cushion was introduced through a suitable valve, but in course of time the air would leak out and renewal of compressed air became necessary, which renewal of air was troublesome and consumed considerable time.

The main object of the present invention is to overcome that difficulty by providing means for automatically supplying air to the air chambers.

Further objects relate to improved details of construction as will be brought out in the following specification.

The accompanying drawings illustrate the invention and referring thereto: Figure 1 is a side elevation of the wheel partly in section. Fig. 2 is a cross section on line $x^2$—$x^2$ Fig. 1. Fig. 3 is an enlarged longitudinal section through the inner portion of a spoke and its cylinder.

1 designates the hub which has cast integrally therewith a series of radial cylinders 2.

3 designates a brake drum.

4 is the rim to which a series of segment blocks 5 are fastened by rivets 6, as shown in Fig. 1.

The tire 8 is preferably a solid tire of rubber, although any form of tire may be used. Two plate rings 10 are secured, as by riveting, to opposite sides of the segment blocks 5. A dished dust-guard 11 is secured to the hub 1 by a nut 12, and its rim slidably bears against the face of the adjacent plate ring 10. Another dust-guard 11' is fastened by screws 13 to the opposite side of the wheel, and these dust-guards cover the interior parts of the wheel and protect the same. The rims of the dust-guards which are slidable on the plate rings 10 have sufficient pressure against the same to prevent the entrance of dust or dirt to the interior, at the same time permitting the rim to oscillate with respect to the hub, or vice versa.

Each segment block 5 has a slot 14 formed concentrically with the hub 1; and slidable in each cylinder 2 is a spoke 15 forming a plunger. The outer end of each spoke has a flattened end 16 which is received in a groove formed in the segment block 5, as clearly shown in Fig. 2, and rests against the bottom of the groove in the segment block, and a pin 17 in the end 16 of the spoke engages in the slots 14 and is only used to hold spokes in place without any bearing on pins as pressure comes on the end of the spoke. This form of connection permits the necessary lateral movement of a spoke with respect to its segment blocks; which movement is necessary when a spoke is turning up or down with the wheel, not being either at the extreme top or bottom. This movement is necessary provided the load is sufficient to produce an eccentricity between the axle and rim or if the rim should be caused to shift eccentrically by passing over obstructions in the road. Manifestly, if the load is not sufficient to produce eccentricity and if there are few or no obstructions in the road there will be little or no deflection of the hub from the center, in which case there would be little or no sliding action of pins 17 in slots 14.

On the inner end of each spoke 15 is a packing 18 which prevents the air from working out of the cylinder along the spoke 15. In the inner end of each cylinder 2 is an air inlet valve, shown in detail in Fig. 3, which comprises a sleeve 19 screwed in the lower end of the cylinder and having a valve seat 20 for a valve 21, the sleeve 19 having air inlet orifices 23 to permit entrance of air into the cylinder when the valve is raised. Air is admitted by a check valve 24 to the central chamber 25 surrounding the hub 1.

In the normal operation of the wheel the spokes will partake of more or less reciprocation in their respective cylinders 2, which amount of reciprocation depends upon the eccentric movement of the rim with respect to the hub and as a spoke moves radially outward in its cylinder the suction produced in the cylinder will cause an inrush of air through the orifices 23 past the valve 21, the latter opening automatically. When the spoke moves radially inward it compresses the air which has thus entered, and this compression of air produces the cushioning action which prevents any shock being imparted from the rim to the hub. Inasmuch as air is thus automatically replenished in the cylinders, the wheel does not require any attention and even though leakage of air should be considerable the automatic replenishing valves have such a great capacity that even a very great leakage would not interfere with the proper operation of the wheel.

What I claim is:

A hub, a series of cylinders carried by the hub, a rim, a series of segment blocks secured to the rim, each segment block having a groove concentric with the rim and having curved slots in the side walls of the groove, said slots being also concentric with the rim, pistons slidable in the respective cylinders, each piston having a squared end portion which is received in the groove in the associated segment block, and the end of the squared portion bearing against the bottom wall of the groove, a pin through the squared portion projecting into the curved slots in the segment block, and valve means for automatically admitting air to the inner ends of the cylinders.

In testimony whereof, I have hereunto set my hand at Los Angeles, California, this 14 day of October 1908.

GEORGE HENRY LANGTON.

In presence of—
G. T. HACKLEY,
FRANK L. A. GRAHAM.